E. J. NIXON.
REMOVABLE LINK.
APPLICATION FILED JUNE 15, 1910.
986,938.
Patented Mar. 14, 1911.
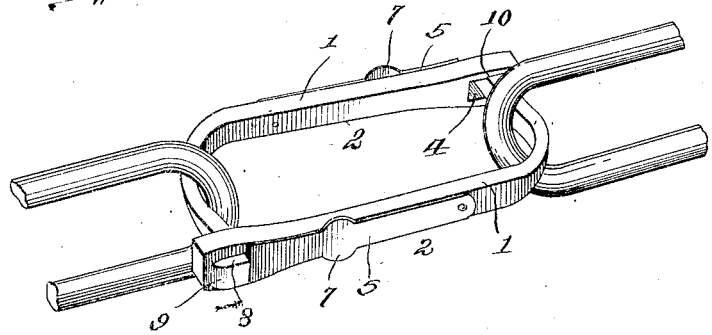
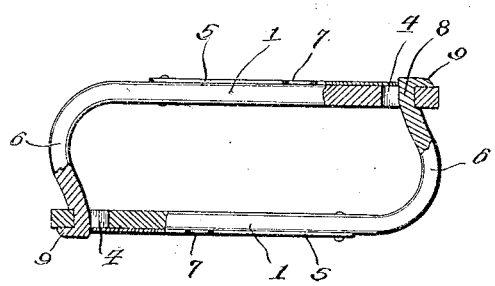
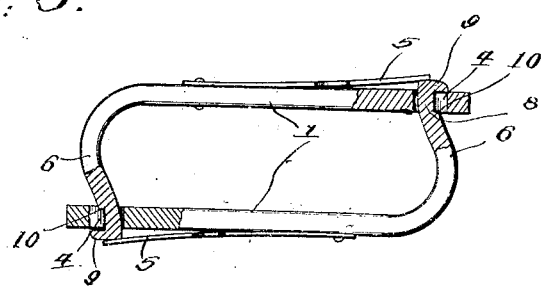
Witnesses
Frederick L. Fox.
Wm. J. Roseth.
Inventor
Edward J. Nixon
By Victor J. Evans
Attorney

UNITED STATES PATENT OFFICE.

EDWARD J. NIXON, OF WESTPOINT, CALIFORNIA.

REMOVABLE LINK.

986,938.  Specification of Letters Patent.  Patented Mar. 14, 1911.

Application filed June 15, 1910. Serial No. 567,025.

*To all whom it may concern:*

Be it known that I, EDWARD J. NIXON, a citizen of the United States, residing at Westpoint, in the county of Calaveras and State of California, have invented new and useful Improvements in Removable Links, of which the following is a specification.

This invention relates to devices employed for uniting sections of chains, either for connecting two separate chains or similar devices or for mending broken chains, and the primary object of the invention is to provide a device of this character of an extremely simple construction by which the adjacent ends of two chains or similar devices or the adjacent ends of a broken chain may be readily connected without detaching the chain.

With the above, and other objects in view, which will appear as the description progresses, the invention resides in the novel construction and combination of parts hereinafter fully described and claimed.

In the accompanying drawing there has been illustrated a simple and preferred embodiment of the improvement, and in which drawing, Figure 1 is a perspective view of the improved link showing the same in applied position. Fig. 2 is a side elevation showing the opposite ends of the link members in section. Fig. 3 is a similar view illustrating the manner of disconnecting the sections.

In a mending link and similar devices as heretofore constructed, one class requires the removal of the chain to a blacksmith shop to enable the mending link to be slitted before insertion, while another class requires to be "coldshut" by the application of a bending force to the link. The first requirement is often very expensive and troublesome, especially when the force is remote from the locality where the chain is employed, entailing long delay and serious interference with work, and in the other requirement a comparatively soft and malleable link of less strength than the remaining links of the chain must be employed. In chains employed upon chain or sprocket wheels, the links must necessarily be of the same size and of uniform interior diameter, and a mending link to be employed in a chain of this character must therefore correspond in size and location when in action to the other links of the chain to cause it to run with the other links in proper order upon the teeth of the wheel.

All of the above requirements are met in the improved mending link herein disclosed, which consists of twin separable members, approximately L-shaped. The long arms 1 of each of the L-shaped sections 2 have their free ends provided with an elongated slot or opening 4. The said long arms 1 are further provided with a flat metallic spring 5 which is pivotally connected therewith and adjacent its juncture with the short arm 6. This spring 5 is adapted to partially close the opening 4, as clearly illustrated in the several figures of the drawing, and the said spring adjacent its free end is enlarged as at 7, so as to provide means whereby the said spring may be readily raised, for a purpose hereinafter to be set forth. The short arm 6 of each of the L-shaped members 2 is provided with a reduced portion 8, the said portion having an offset or right angularly disposed head 9. The distance between the shoulder 10 and the under face of the offset head 9 is equal to the width of the longer arm 1 and the width of the said head 9 also equals the length of the slot 4.

In assembling the members 2, it is merely necessary to insert the heads 9 within the openings 4 of each of the sections until the shoulders 10 of the opposite arms contact with the inner faces of the elongated arms 1 of the L-shaped members. By this arrangement, it will be noted that the projecting portions of the springs 7 will be forced upwardly. It will be further noted that a sliding movement of one or both of the said L-shaped members 2 will cause the under face or lip of the offset head to move toward the extremity of each of the arms 1 and after the same has been slid beyond the end of the springs 7, the said springs will swing downwardly so as to contact the reduced portion 8 of the said head 9, thus effectively and securely locking the sections together.

When it is desired to separate the sections, it is merely necessary for the operator to grasp the enlargements or finger holds 7 upon the springs to swing the same away from the arms 1 of the sections and a rearward or opposite pressure upon one or both of the sections will allow the heads 9 to be readily removed from engagement within the slots 4.

From the above description, taken in connection with the accompanying drawings, it will be noted that I have provided an extremely simple and thoroughly effective device for the purpose intended, and while I have illustrated and described the preferred embodiment of the improvement, as it now appears to me, minor details of construction, within the scope of the following claim may be resorted to if desired.

Having thus fully described the invention, what I claim as new is:—

A mending link comprising twin separable members, each of which consists of an approximately L-shaped member, the longer arms of each of said members being provided with an elongated opening adjacent their ends, the shorter arms of each of the members being provided with a reduced offset headed portion, the headed portions of one of the members adapted to be inserted within the elongated opening of the opposite member, and spring elements contacting the headed portions of the members to retain the said members within the openings engagement with each other.

In testimony whereof I affix my signature in presence of two witnesses.

EDWARD J. NIXON.

Witnesses:
F. A. WILSON,
JOSEPH G. O'BRIEN.